United States Patent
Mark et al.

[19]

[11] Patent Number: 5,852,857
[45] Date of Patent: Dec. 29, 1998

[54] JAMMING DEVICE FOR CORD OR TAPE FASTENER SUCH AS SHOELACES

[76] Inventors: Rudolf Mark, Spital am Pyhrn 152; Thomas Mark, Spital am Pyhrn 204, both of A-4582 Spital am Pyhrn, Austria

[21] Appl. No.: 875,869

[22] PCT Filed: Feb. 5, 1996

[86] PCT No.: PCT/AT96/00017

§ 371 Date: Aug. 5, 1997

§ 102(e) Date: Aug. 5, 1997

[87] PCT Pub. No.: WO96/24269

PCT Pub. Date: Aug. 15, 1996

[30] Foreign Application Priority Data

Feb. 7, 1995 [AT] Austria ........................................ 221/95

[51] Int. Cl.[6] .................................................. A43C 7/04
[52] U.S. Cl. ........................ 24/713.6; 24/712.6; 24/712.2
[58] Field of Search ................................ 24/713.6, 197, 24/712.1, 168, 712, 132 R, 712.5, 712.7, 205 EC, 205 AL; 36/50.5

[56] References Cited

U.S. PATENT DOCUMENTS

| | | | |
|---|---|---|---|
| 736,742 | 8/1903 | Knapp | 24/712.6 |
| 947,898 | 2/1910 | Foster et al. | 24/712.6 |
| 948,460 | 2/1910 | Partridge | 24/712.6 |
| 1,121,157 | 12/1914 | Baker | 24/712.6 X |
| 1,222,835 | 4/1917 | Winbray | 24/712.6 |
| 1,266,823 | 5/1918 | Kohlhaas | 24/712.6 |
| 1,279,043 | 9/1918 | Treadgold | 24/712.6 |
| 1,442,468 | 1/1923 | Cochrane . | |
| 1,616,694 | 2/1927 | Hoppe | 24/712.6 |
| 1,876,505 | 9/1932 | Berger . | |
| 1,913,102 | 6/1933 | Berger | 24/712.2 X |
| 3,225,402 | 12/1965 | Altman et al. | 24/712.6 |

FOREIGN PATENT DOCUMENTS

| | | |
|---|---|---|
| 0 398 303 | 5/1990 | European Pat. Off. . |
| 619919 | 4/1927 | France ................................ 24/713.6 |
| 933281 | 5/1948 | France . |
| 1110669 | 2/1956 | France . |
| 221095 | 12/1908 | Germany . |
| 674 445 A5 | 6/1990 | Switzerland . |
| 102091 | 12/1916 | United Kingdom . |

*Primary Examiner*—Anthony Knight
*Assistant Examiner*—Robert J. Sandy
*Attorney, Agent, or Firm*—Bell Selzter Intellectual Property Law Group of Alston & Bird LLP

[57] ABSTRACT

The invention relates to a jamming device (1) for a cord or tape fastener (30), such as e.g. shoelaces (31), for shoes, jackets, trousers and other articles of clothing, comprising a ring lug (3) for looping the fastening means (30) and a rivet strap (2) which forms a hinge bearing (14) for the ring lug (3) and which is joined to the article of clothing by means of at least one fixing element, such as for example a rivet, stitching or gluing, the rivet strap (2) having a jamming cleat (43) joined to the rivet strap and provided with an end face (35) which is surrounded by the ring lug (30) when the latter is in a position more or less parallel with a contact surface (11) in a jamming zone (29) which is made up of jamming surfaces (36) formed by the end face (35) and an inner surface of the ring lug (3) facing the end face (35), the jamming surfaces (36) being separated from each other by a gap (38) in the jamming zone (29).

20 Claims, 5 Drawing Sheets

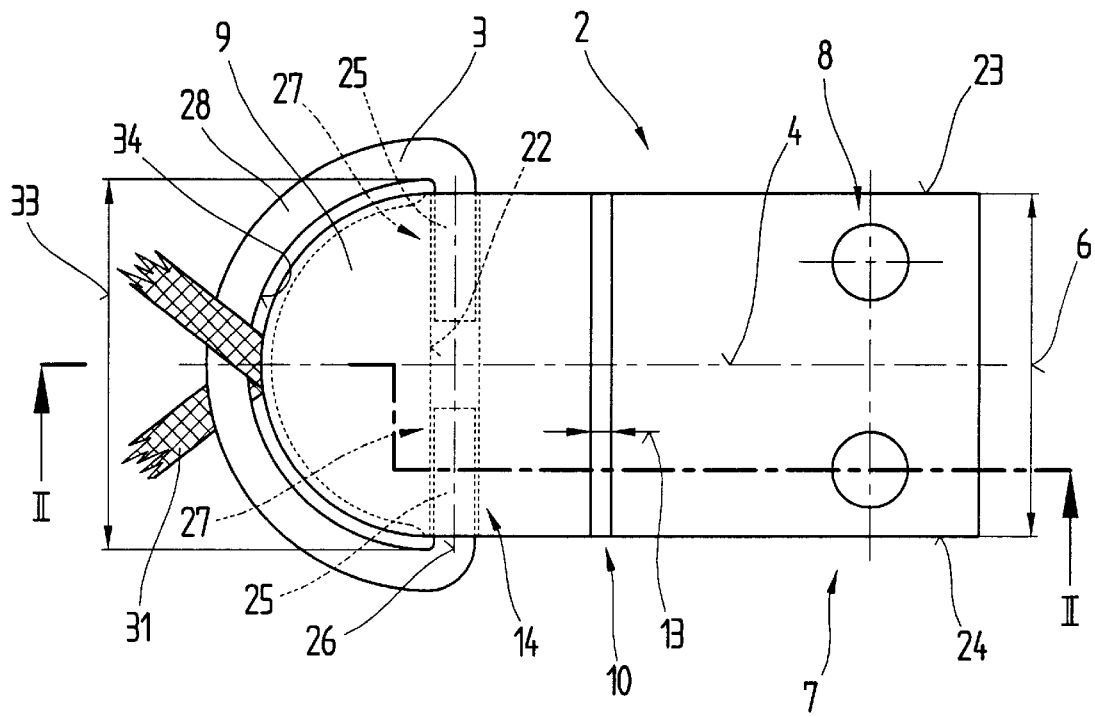
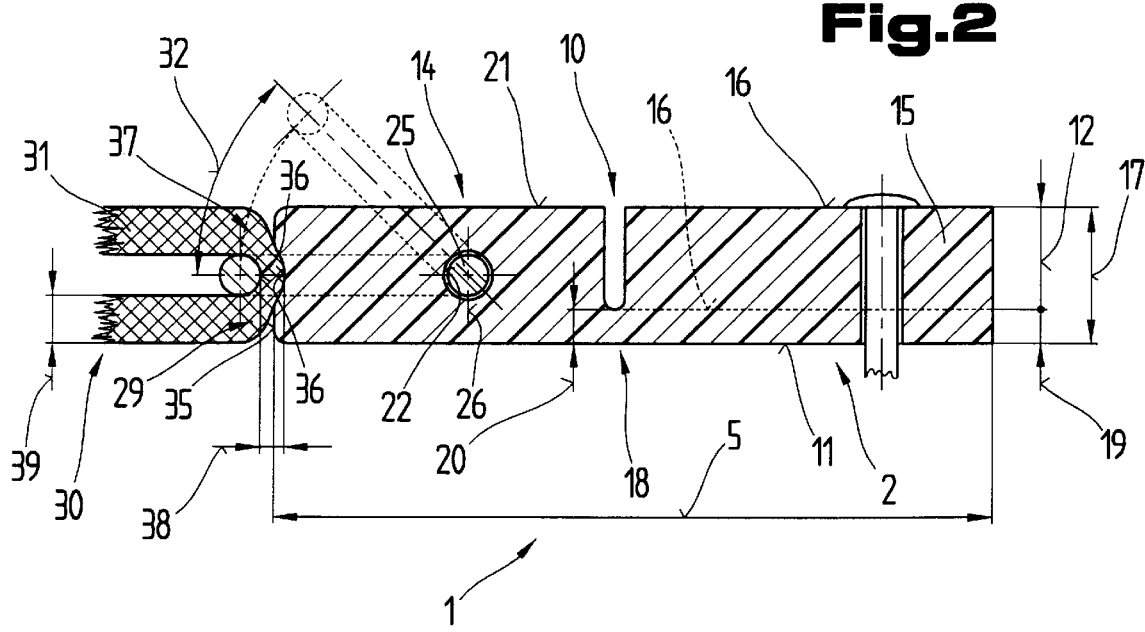

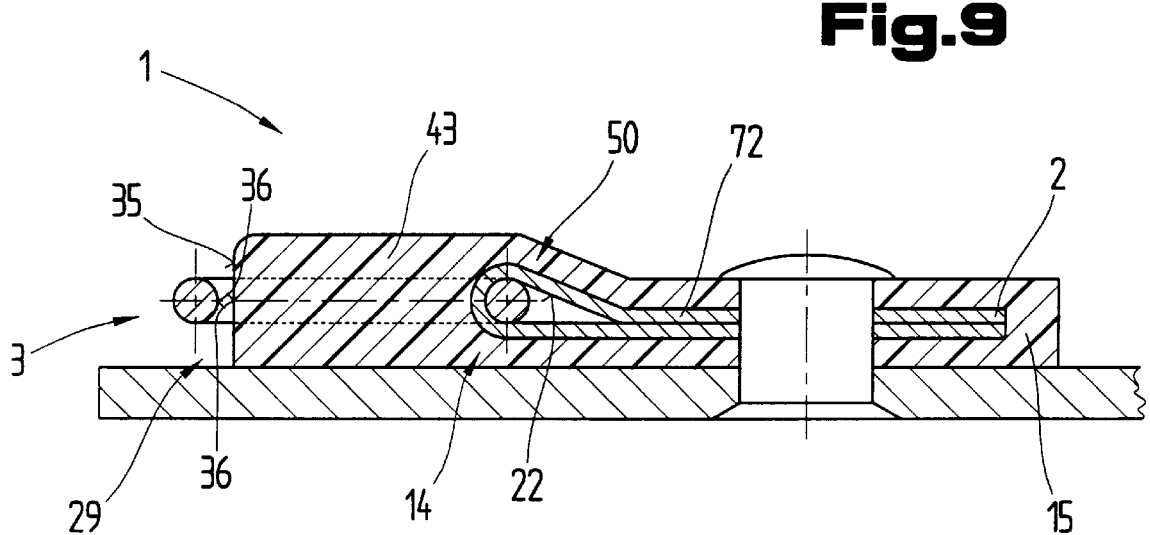

JAMMING DEVICE FOR CORD OR TAPE FASTENER SUCH AS SHOELACES

The invention relates to a jamming device as described in the introductory part of claim 1.

For lacing shoes, jackets or trousers, there exist variously shaped hooks, rings, eyes etc. for the fastening means such as shoelaces for example. For footwear with extended uppers, such as work, walking and sport shoes for example, there are exacting requirements regarding the security of the lacing, and also the comfort of the wearer, which greatly depends on the proper functioning of the lacing elements. One altogether essential requirement for the comfort of this kind of footwear is that it should be possible for the wearer to adopt different tensions in different regions of the lacing.

The object of the invention is to form a jamming device for a cord or tape fastener so that when a shoelace, for example, is being pulled tight it runs through the device freely, but can be securely jammed with the desired tension.

The object of the invention is achieved by the features set out in claim 1. Surprisingly these have the advantage that the design according to the invention of the ring lug and jamming cleat allows the fastening means, such as a shoelace for example, to pass freely through as the shoe is being laced up (and also as it is being unlaced), but the shoelace can be secured by hinging the ring lug down into a jamming position. Yet it also allows a different tension, and hence different clasping forces, to be applied in adjacent regions of the lacing, so that lower tension is applied for example to parts which are more sensitive to pressure, such as the instep, than, say, the region between shin and instep.

A design according to claim 2 is also advantageous: this provides effective jamming of the fastening means.

An embodiment according to claim 3 is also advantageous: this jams the fastening means over the entire region of the jamming cleat which is surrounded by the ring lug.

One possible advantageous development is described in claim 4: here the jamming device, in particular the cleat, can be made in one production operation, resulting in a reduction in production costs.

Also advantageous is a design as described in claim 5, as this allows the fixing tab to be made extremely thin and flexible, with thickening only in the jamming region and/or the region of the ring lug mounting, resulting in a reduction in both material and production costs. Moreover the resistance to bending and the strength of the fixing device can be varied to suit the particular application.

Also advantageous is an embodiment according to claim 6, as it provides effective jamming in the region of the wraparound of the fastening means and increases the area of contact between fastening means, ring lug and jamming cleat, resulting in improved positive locking and frictional connection of the fastening means and so-called overcentre locking to prevent accidental loosening.

A possible advantageous development is described in claim 7: this allows the ring lug to be swung above the jamming cleat, which is particularly advantageous when the fastening means is initially threaded through the ring lug.

Also advantageous is a design according to claim 8: this allows a further saving of material without adversely affecting the strength of the hinge bearing.

An embodiment according to claim 9 is also favourable: this provides effective jamming of the fastening means in the jamming device.

A development according to claim 10 is also possible: this gives the jamming device elasticity and an attractive appearance in a simple way and at low material and production cost, without sacrificing strength, especially in the hinge bearing.

A construction according to claim 11 has the advantage that the mounting for the ring lug can be produced in a simple manner.

An alternative embodiment according to claim 12 is advantageous: this enables the jamming cleat with its fixing tab and the rivet strap to be fabricated in separate equipment, and only joined together at the moment of assembly of the jamming device consisting of these parts on an article of clothing. In addition this "sandwich construction" of the jamming device has a positive effect on the strength of the device.

A possible advantageous design is described in claim 13. Here the rivet strap and fixing tab can be mounted on the article of clothing with a single fixing element.

Also advantageous is a design according to claim 14, which further increases the strength of the device.

An alternative embodiment according to claim 15 is also favourable: it allows the jamming device to be made in one piece, which is particularly advantageous where cold-forming production techniques are used.

Another possibility is the development according to claim 16: this enables the rivet strap to be latched in the vertical direction, thereby preventing the rivet strap from being lifted off the fixing tab, and also preventing the jamming device from opening accidentally.

A construction according to claim 17 has the advantage that it reduces the number of production steps, thus reducing production costs, and a hinge bearing is obtained in a simple manner by assembling the separate parts consisting of ring lug, jamming cleat and rivet strap.

Claim 18 describes a favourable embodiment in which the ring lug is prevented from pivoting accidentally; this is absolutely essential if the assembly of the jamming device is automated. Furthermore overcentre locking of the ring lug is provided.

Also advantageous is a design according to claim 19, in which the ring lug can be swung out of the jamming zone only through elastic deformation, to allow insertion of the fastening means into the jamming zone, e.g. when lacing up. Accidental pivoting of the ring lug is prevented.

Finally, a development according to claim 20 is possible: in this, the rivet strap is enveloped in the jamming cleat and/or fixing tab, thus forming a sandwich component possessing good strength properties.

In order that the invention maybe better understood, it will be described in detail with reference to the embodiments shown by way of example in the drawings.

FIG. 1 shows a jamming device according to the invention in plan view;

FIG. 2 shows the jamming device sectioned on the lines II— II in FIG. 1;

FIG. 9 shows a further embodiment of the jamming device according to the invention, viewed in section and in elevation.

Figure 3:
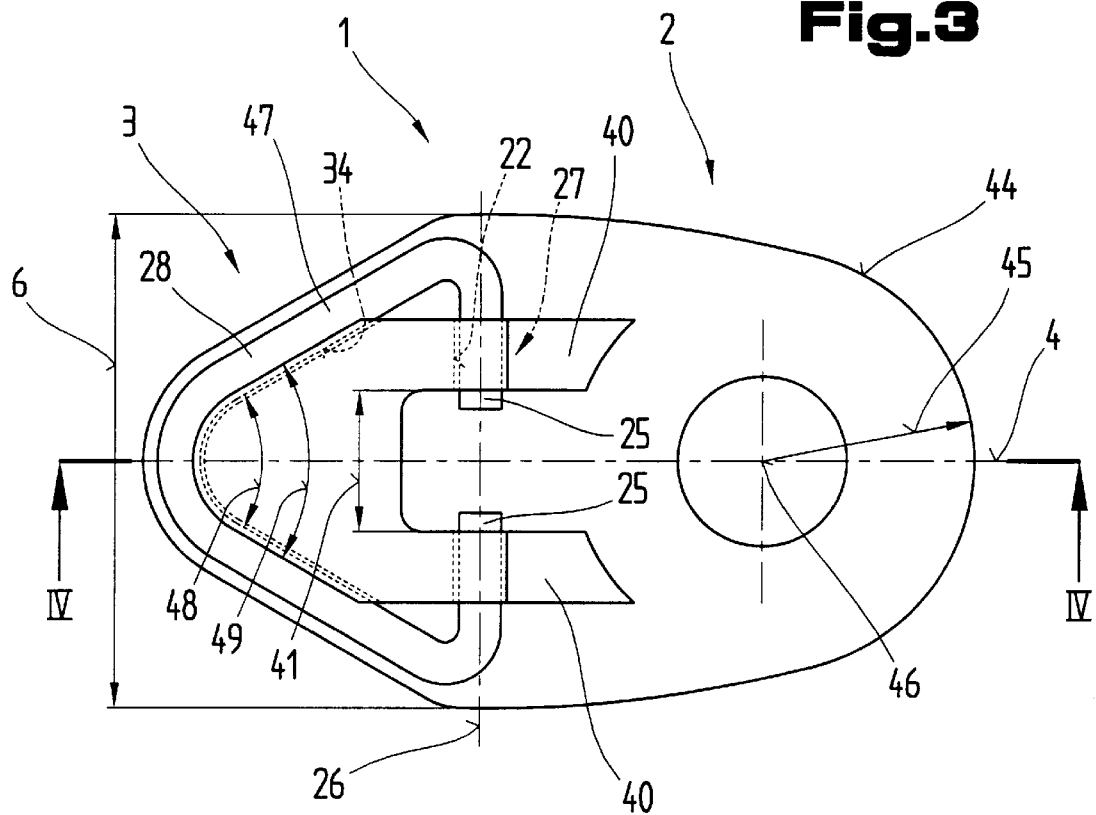
FIG. 3 shows a further embodiment of the jamming device according to the invention, in plan view.

FIGS. 1 and 2 (which will be described together) show a jamming device 1 which is made up of a rivet strap 2 and a ring lug 3. The rivet strap 2 is formed symmetrically about a longitudinal centre line 4, with a length 5 extending parallel therewith, and a width 6 measured at right angles thereto. A portion 7, having, for example, two holes 8 located symmetrically about the longitudinal centre line 4, is separated by a region 10 of reduced thickness from a jamming cleat 9 a portion of which is surrounded by the ring lug 3. The jamming cleat 9 is joined to the rivet strap 2.

The region 10 of reduced thickness has a depth 12 measured at right angles to a contact surface 11 which lies on the surface of an article of clothing such as for example a shoe, a jacket, or trousers, and a width 13 measured at right angles to the depth and parallel with the longitudinal centre line 4.

The function of the region 10 of reduced thickness, which extends over the whole width 6, is to make the portion which forms the jamming cleat 9 and a hinge bearing 14 movable in relation to the portion 7 which forms a fixing tab 15. A thickness 17 separates an upper surface 16 of the fixing tab 15 from the contact surface 11 on the opposite side. The fixing tab 15 and the jamming cleat 9 with the hinge bearing 14 are joined together, for example as one piece by a connecting web 18. However, it is also possible to form the rivet strap 2 without the region 10 of reduced thickness separating the jamming cleat 9 from the fixing tab 15, by using suitably pliable materials such as suitable plastic materials for example. As is shown in broken lines, it is also possible for the distance 19 separating the upper surface 16 from the contact surface 11 to be smaller than the thickness 17. The distance 19 can be minimized so that the fixing tab 15 can also be sewn or glued to the article of clothing, in which case the hole 8 is unnecessary. Again, the distance 19 can be made equal to a thickness 20 of the connecting web 18 which is the thickness 17 minus the depth 12. In this case, an upper surface 21 of the jamming cleat 9, opposite to, and extending parallel with, the contact surface 11, lies at a distance equal to the depth 12 from the upper surface 16 opposite to the contact surface 11.

The hinge bearing 14 separated from the fixing tab 15 by the region 10 of reduced thickness has one or more bearing holes 22 extending more or less parallel with the contact surface 11 and with the width 6. These may extend as round bores across the whole width 6. Alternatively, however, two bearing holes 22 formed as blind pocket holes may be provided. From lateral faces 23, 24 of the rivet strap 2 separated by the width 6 and extending parallel with the longitudinal centre line 4, hinge arms 25 of the ring lug 3 are aligned with each other in the bearing hole 22 and extend towards the longitudinal centre line 4. These arms are arranged concentrically about a pivot axis 26 which extends parallel with the contact surface 11 and with the width 6, at the centre of the bearing hole 22. The distance between the pivot axis 26 and the contact surface 11 (in the direction towards the upper side 21) may be such that the hinge arms 25 are located within the region bounded by the depth 12.

The ring lug 3 is formed for example in the shape of a C with straight end regions 27 projecting into the bearing hole 22 and forming the hinge arms 25. A hoop 28 linking the hinge arms 25 to each other extends for example approximately in a semicircle around a jamming zone 29 of the jamming cleat 9 whose shape is for example likewise approximately semicircular. Alternatively, the hoop 28 may be formed with a leg extending more or less parallel with the width 6 and linked to the hinge arms 25 parallel with the said leg by legs extending parallel with the lateral faces 23 and 24.

Alternatively, the hoop 28 may be formed without a leg parallel with the width 6, but with two legs which are arranged at an angle to one another and which are joined to each other and to the hinge arms 25. The ring lug 3 may be bent from wire with for example a round, square or triangular cross-section. In the assembled condition the ring lug 3 is in a position more or less parallel with the contact surface 11, forming with the jamming zone 29 of the jamming cleat 9 the locking position for a fastening means 30, e.g. for a shoelace 31. However, as a result of slight play of the hinge arms 25 in the bearing hole 22 and/or elastic deformation of the hoop 28 and of the hinge arms 25, it can be splayed so that it can be pivoted through a pivot angle 32, of less than 180°, into the release position (as shown in broken lines), releasing the fastening means 30. In order for this to happen, it is necessary inter alia that the width 6, which for example also bounds the jamming cleat 9, be slightly smaller than an internal width 33 of the ring lug 3 extending parallel with the bearing hole 22 and defining an inner surface 34 of the ring lug 3 facing the rivet strap 2. An end face 35 extending for example at right angles to the contact surface 11 faces towards the inner surface 34 and bounds the end region of the jamming cleat 9 with its jamming zone 29. The end face 35 of the jamming cleat 9, together with the inner surface 34 of the ring lug 3, forms, when the ring lug is positioned more or less parallel with the contact surface 11, jamming surfaces 36 between which the fastening means 30 is nipped in the jamming zone 29. The end face 35 may be flat, or may have a groove-like indentation 37 which is concavely formed back towards the hinge arms 25. The cross-section of this indentation 37, which forms the jamming surface 36, may be 25 curved or angular. A point on the surface of the groove-like indentation 37 which lies closest to the hinge arms 25 is separated from the inner surface 34 of the hoop 28 by a gap 38. This establishes the distance between the jamming surfaces 36, and, at least in the jamming zone 29, is smaller than a thickness 39 of the fastening means 30 in the undeformed condition. Alternatively, it may be made more or less constant over the entire extent of the end face 35 or inner surface 34. If the hoop 28 is made in the form of a circular arc, both the groove-like indentation 37 and the end face 35 extend more or less concentrically with the inner surface 34.

Furthermore the size of the gap is such that, when the ring lug 3, and in particular the hoop 28, is in the undeformed condition, that is to stay when the hoop 28 is not being subjected to any deformation force and no fastening means 30 is inserted, the inner surface 34 is in contact with the end face 35, thus preventing accidental pivoting of the ring lug 3. This is particularly necessary if the mounting of the clamping device 1 on an article of clothing is automated, as self-actuated pivoting of the ring lug 3 into an undefined intermediate position greatly increases the risk of malfunction of the mounting machine.

However, when a fastening means 30 is to be inserted, the elasticity of the ring lug 3 allows it to be pivoted clear of the end face 35, towards the upper side 21 and the fixing tab 15, through the exertion of a deforming force.

The groove-like indentation 37 in the end face 35 forms a bead-like projection in the region between the indentation and the upper surface 16 of the jamming cleat 9, and this projection constitutes a dead centre point when the ring lug 3 is pivoted. When the ring lug 3 with the shoelace 31 drawn through it is pivoted into a jamming position in which the ring lug 3 extends more or less parallel with the upper surface 16, this dead centre point has to be surmounted. Pivoting is effected by the exertion of an obliquely directed pull on the shoelace 31, with one force component resulting from the pull acting towards the contact surface of the jamming cleat 9. Jamming of the shoelace 31 can therefore be performed as a follow-on to the lacing operation by an appropriate angle of pull, and therefore does not require the help of the user's other hand. Moreover, the dead centre point formed by the bead-like protuberance acts as a reliable lock counteracting accidental and unintentional release of the jamming action of the device.

Figure 4:
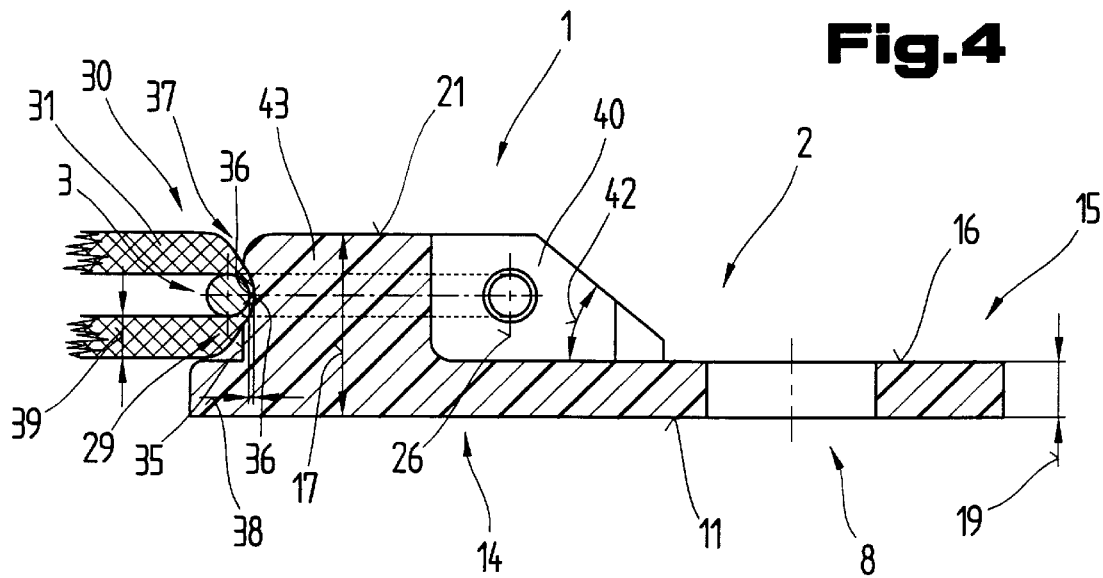
FIG. 4 shows the jamming device sectioned on the lines IV—IV in FIG. 3.

A further embodiment of the jamming device 1 with a rivet strap 2 and a ring lug 3 is shown in FIGS. 3 and 4 (which will be described together). Here the rivet strap is formed so that the upper surface 16 extends parallel with the contact surface 11 at a distance 19 therefrom which is smaller than the thickness 17 of the hinge bearing 14 bounded by the contact surface 11 and the upper side 21. The fixing tab 15 also has the hole 8 to accommodate the fixing element.

A rivet is not the only possible fixing element: it is also possible to join the fixing tab 15 to the article of clothing by stitching for example. On the one hand, this eliminates the hole 8; on the other hand, the fixing tab 15 must be made as thin as possible so that the distance 19 in particular is kept as small as possible.

The hinge bearing 14 is designed with each of the bearing holes 22 extending concentrically about the pivot axis 26 of the hinge arms 25 in the end regions 27 of the ring lug 3, in a rib 40 extending parallel with the longitudinal centre line 4. The ribs 40 are for example arranged symmetrically with respect to the longitudinal centre line 4 at a distance 41 from one another and slope up from the upper surface 16 towards the upper side 21 at an angle 42. The ribs 40 are formed on a jamming cleat 43 which is joined as one piece to the fixing tab 15, and is at least partially surrounded by the inner surface 34 of the ring lug 3. The jamming cleat 43 has a groove-like indentation 37 forming the jamming zone 29 and indenting the end face 35 of the jamming cleat 43 concavely towards the pivot axis 26. The gap 38 thereby formed between the inner surface 34 of the ring lug 3 and the most recessed point (towards the pivot axis 26) of the groove-like indentation 37 is not greater than the thickness 39 of the fastening means 30, for example the shoelace 31, in the undeformed condition. Viewed in plan, the fixing tab 15 has for example a curved contour 44 which extends symmetrically about the longitudinal centre line 4 and which in the region around the hole 8 may extend in a circular arc with a radius 45 about an axis of symmetry 46 of the hole 8. The points on the contour 44 furthest from the longitudinal centre line 4 are bounded by the width 6.

The ring lug 3, or hoop 28 linking the two hinge arms 25 to each other, is formed from two legs 47 which converge with each other symmetrically about the longitudinal centre line 4 at an angle 48. Since the inner surface 34 of the ring lug 3, or of the legs 47, extends around the end face 35 with a more or less constant clearance 38, the end face 35 has an angle of convergence 49 matching the leg angle 48. The inner surface 34 and the end face 35 (or the surface of the groove-like indentation 37) form the jamming surfaces 36, as already described.

Figure 5:
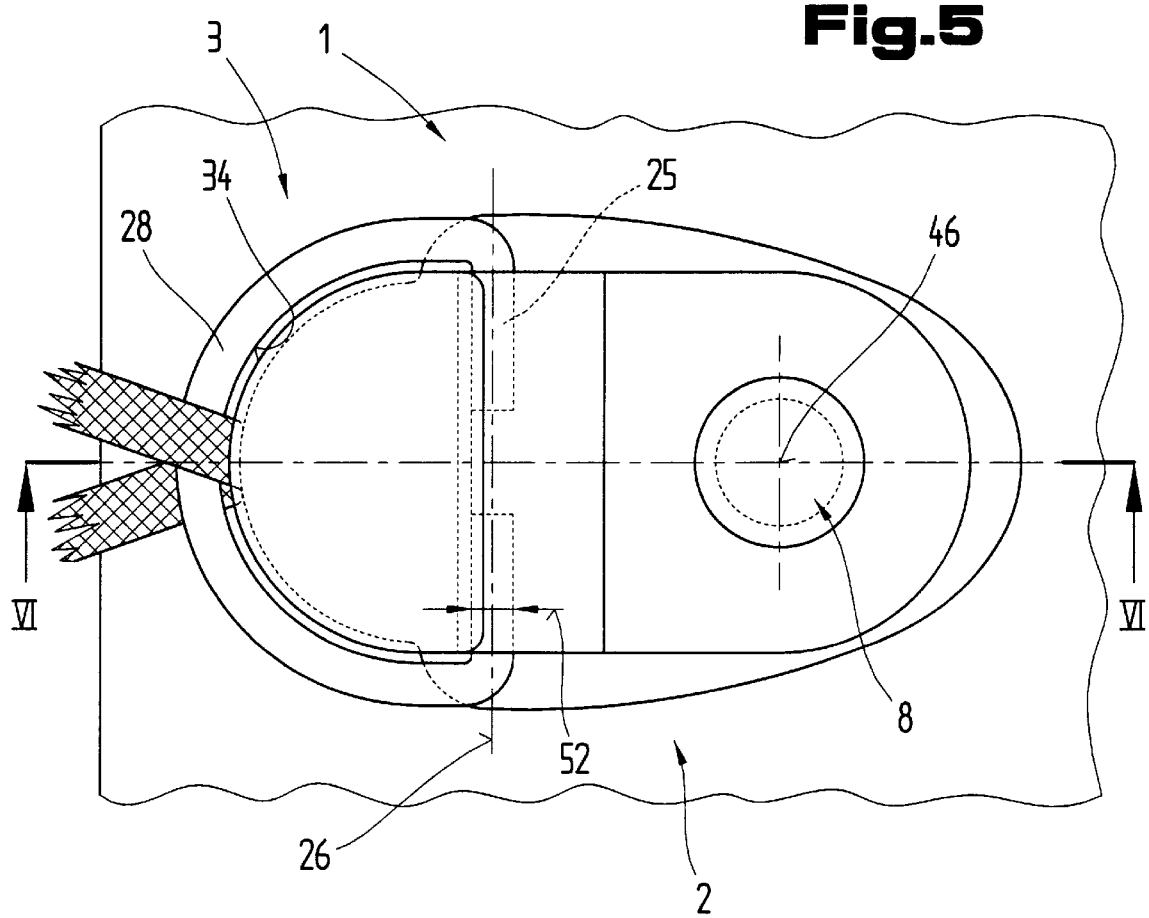
FIG. 5 shows another embodiment of the jamming device according to the invention, in plan view.
Figure 6:
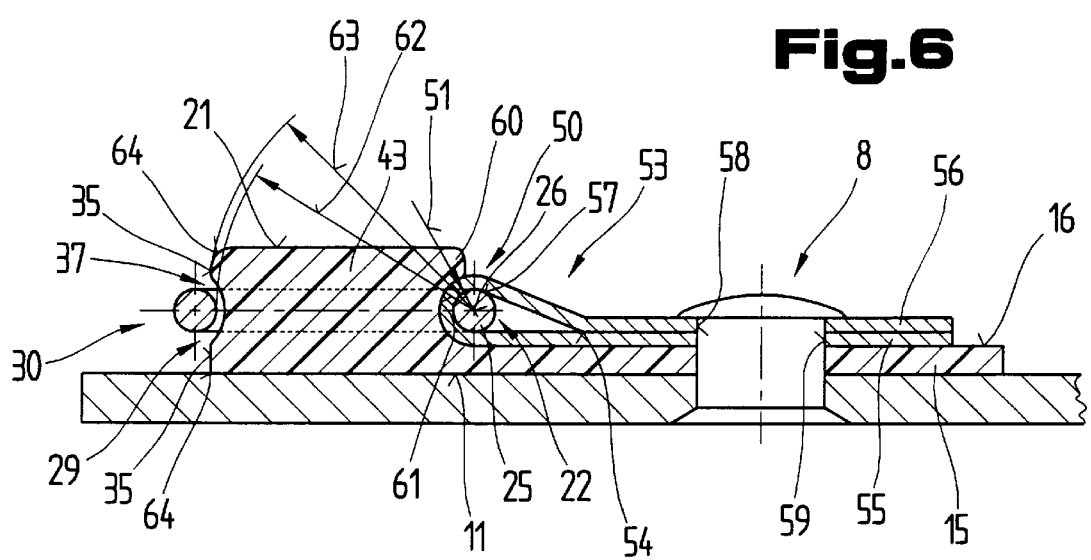
FIG. 6 shows the jamming device sectioned an the lines VI—VI in FIG. 5.

Another embodiment of the jamming device 1 is shown in FIGS. 5 and 6 (described together). In this embodiment the rivet strap 2 is designed as an independent part, separate from the jamming cleat 43 and from the fixing tab 15 formed on the latter, and is arranged on the upper surface 16 of the fixing tab 15. This rivet strap 2 is a two-ply component made by bending sheet metal and has a bend zone 50 which is adjacent to the jamming cleat 43, which is made in one piece with the fixing tab 15, for example from plastic material. The bend zone 50 has an inner bend radius 51 which is approximately equal to half the diameter 52 of the hinge arms 25 and is measured from the pivot axis 26 extending through the centre of the hinge arm 25.

The bend zone 50 clasps the hinge arms 25 with an angle of contact which is for example smaller than 360° so that a sloping region 53 is formed, sloping upwards (i.e. in the direction away from the upper surface 16) from a point of contact 54 which lies between the hinge arms 25 and the hole 8 and at which two legs 55 and 56 of the rivet strap 2 adjoin each other, towards a tangent point 57 located on the circumference of the hinge arms 25 or [on] the inner circumference, bounded by the inner bend radius, of the bend zone 50. The bearing hole 22 in which the hinge arms 25 are mounted is formed by the bend zone 50 and the sloping region 53. The two legs 55 and 56 of the rivet strap 2 have through holes 58 and 59 formed concentrically with one another and with the axis of symmetry 46 of the hole 8, and are thus in register with the hole 8.

On the side facing the bend zone 50 and facing away from the jamming zone 29, the jamming cleat 43 has a latching projection 60 located some way above the upper surface 16 and projecting towards the hole 8. This creates an indentation 61 which concavely extends in the opposite direction to the said hole 8 and in which the bend zone 50 of the rivet strap 2 is bedded. This prevents the rivet strap 2, and in particular the bend zone 50, from lifting off the upper surface 16 when force is applied in the opposite direction to the surface 16. The jamming cleat 43 also has the indentation 37 already described. The hoop 28 in this variant again has a circular arc profile, and the jamming cleat 43 also has a circular arc profile, formed by the end face 35. As a result, the rivet strap 2 is positioned with respect to the jamming cleat 43 upon automated assembly.

The inner surface 34 of the ring lug 3 is separated from the pivot axis 26 of the hinge arms 25 by a pivot radius 62. In the undeformed condition of the ring lug 3 and of the hoop 28, this radius is smaller than a span 63 between the pivot axis 26 and an upper rim 64. This represents the line of contact of the end face 35 with the upper side 21 or contact surface 11.

The result is that the undeformed ring lug 3 cannot be accidentally swung over the jamming zone 29, or past the contact surface 11 or upper side 21. However, when the fastening means 30 is to be inserted into the jamming zone 29, the inherent elasticity of the ring lug 3 allows the pivot radius 62 to be lengthened so that it at least assumes the dimension of the span 63, thus allowing the ring lug 3 to be pivoted past the bearing surface 11 or upper side 21.

Figure 7:
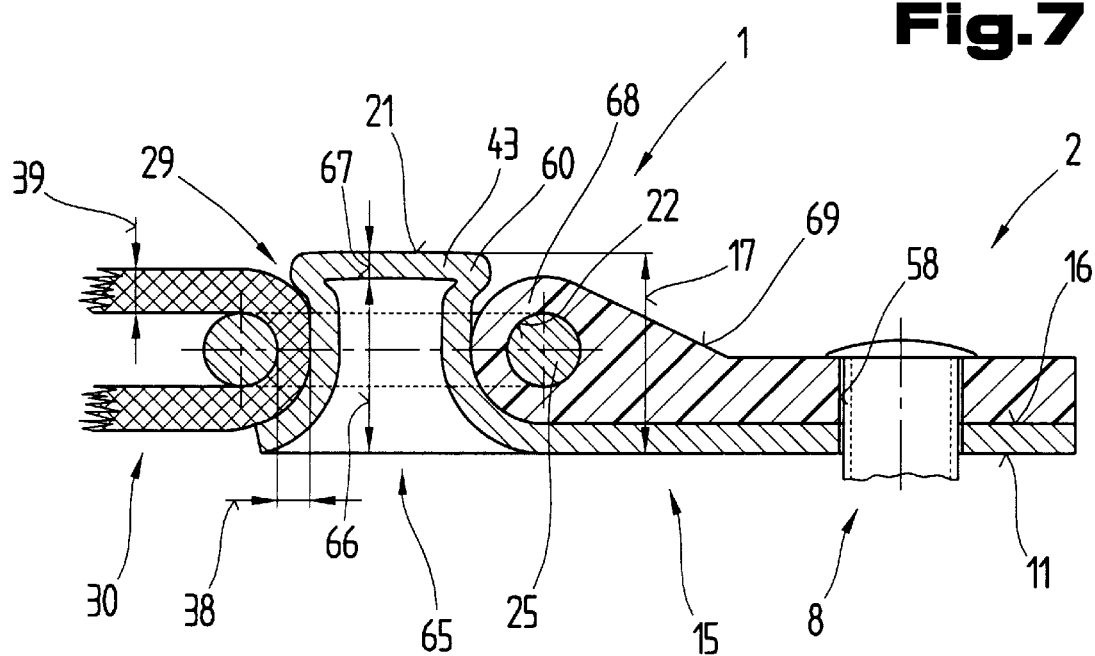
FIG. 7 shows a further embodiment of the jamming device according to the invention, viewed in section and in elevation.

Another embodiment of the jamming device 1 is shown in FIG. 7. This consists of the rivet strap 2 and the jamming cleat 43, which is joined as one piece to the fixing tab 15 and is formed as an injection or press moulded or cast part of metal and/or plastic material. On the side facing away from the rivet strap 2, the jamming cleat 43 has the jamming zone 29 for the fastening means 30. Again, the jamming effect is obtained as a result of the fact that the gap 38 is smaller than the thickness 39 of the fastening means 30 in the undeformed condition. Unlike the jamming cleat of the previous variants, the jamming cleat 43 is not a solid body, but has for example a cavity 65 whose depth 66 measured at right angles to the contact surface 11 is smaller, by an amount equal to the wall thickness 67 of the fixing tab 15 or of the jamming cleat 43, than the thickness 17 bounded by the contact surface 11 and the opposing upper side 21. The jamming cleat 43 also has, on the side facing the rivet strap 2, the latching projection 60 which prevents relative movement of the rivet strap 2 in the opposite direction to the contact surface 11, or towards the jamming zone 29. The rivet strap 2 is formed as a plastic part, with a reinforcement region 68 in which the bearing hole 22 for the hinge arms 25 is arranged. From the reinforcement region 68 a sloping surface 69 slopes down with respect to the upper surface 16, towards the hole 8 and the through hole 58 corresponding with the latter.

Figure 8:
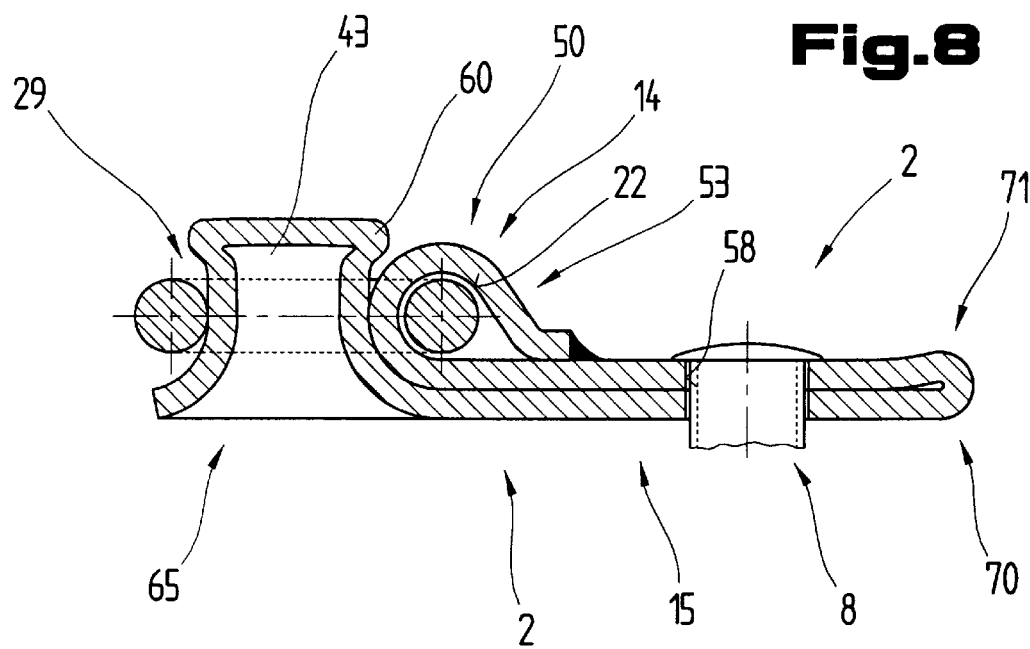
FIG. 8 shows another embodiment of the jamming device according to the invention, viewed in section and in elevation.

FIG. 8 shows an alternative embodiment in which the rivet strap 2 is formed in one piece as a two-ply bent component. The jamming cleat 43 is connected to the fixing tab 15 and rivet strap 2 in one piece, and has the latch projection 60, jamming zone 29 and cavity 65. The rivet strap 2, which has the bend zone 50 forming the hinge bearing 14 or bearing hole 22, and the sloping region 53, is joined, in an end region 70 opposite the jamming-zone 29, to the fixing tab 15, in one piece, at a bend 71. This is formed so that the through hole 58 is in concentric register with the hole 8.

Finally, a development of the jamming device 1 is illustrated in FIG. 9. This consists of the jamming cleat 43 and the fixing tab 15 formed thereon. As in the embodiments previously described, the jamming cleat 43 is surrounded by the ring lug 3, and the opposing jamming faces 36 form the jamming zone 29. However, the end face 35 is flat (without the groove-like indentation 37), providing a jamming face 36 which is also flat. Embedded in the fixing tab 15 is the rivet strap 2, which is formed as a bent component with the bend zone 50 adjacent to the jamming cleat 43. Alternatively, the rivet strap 2 may be formed for example from ceramics or from latticed or woven plastic fibres reinforced with fibres, particularly glass, carbon or aramide fibres. In this way a reinforcing part 72 is obtained, to accommodate in particular the hinge bearing 14 or its bearing holes 22.

It is of course possible to combine the various details of embodiments which may constitute separate inventions. For a clearer disclosure of the details according to the invention, the illustrations of the jamming device in the individual figures are not drawn to scale.

LIST OF REFERENCE SYMBOLS

| List of reference symbols | |
|---|---|
| 1 jamming device | 41 distance |
| 2 rivet strap | 42 angle of slope |
| 3 ring lug | 43 jamming cleat |
| 4 longitudinal centre line | 44 contour |
| | 45 radius |
| 5 length | 46 axis of symmetry |
| 6 width | 47 leg |
| 7 portion hole | 48 leg angle |
| | 49 angle of convergence |
| 9 jamming cleat | 50 bend zone |
| 10 region of reduced thickness | 51 bend radius |
| | 52 diameter |
| 11 contact surface | 53 sloping region |
| 12 depth | 54 point of contact |
| 13 width | 55 leg |
| 14 hinge bearing | 56 leg |
| 15 fixing tab | 57 tangent point |
| 16 upper surface | 58 through hole |
| 17 thickness | 59 through hole |
| 18 connecting web | 60 latch projection |
| 19 distance | 61 indentation |
| 20 thickness | 62 pivot radius |
| 21 upper side | 63 span |
| 22 bearing hole | 64 rim |

-continued

| List of reference symbols | |
|---|---|
| 23 lateral surface | 65 cavity |
| 24 lateral surface | 66 depth |
| 25 hinge arm | 67 wall thickness |
| 26 pivot axis | 68 reinforcement region |
| 27 end region | 69 sloping surface |
| 28 hoop | 70 end region |
| 29 jamming zone | 71 bend |
| 30 fastening means | 72 reinforcing part |
| 31 shoelace | |
| 32 pivot angle | |
| 33 inner width | |
| 34 inner surface | |
| 35 end face | |
| 36 jamming surfaces | |
| 37 indentation | |
| 38 gap | |
| 39 thickness | |
| 40 rib | |

We claim:

1. A jamming device for securing a cord or tape fastener of an article of clothing, comprising:

a ring lug for looping the tape fastener therethrough;

a rivet strap pivotally attached to the lug and adapted to be joined to the article of clothing; and a jamming cleat joined to the rivet strap and provided with an end face which is surrounded by the ring lug when the ring lug is in a predetermined jamming position, the end face of the jamming cleat having a jamming surface which opposes and is spaced by a gap from an inner surface of the ring lug when the ring lug is in the predetermined jamming position, the jamming surface and the inner surface defining a jamming zone for engaging the tape fastener therebetween; and the jamming cleat being generally rigidly joined to the rivet strap such that the jamming cleat is maintained generally in a predetermined fixed position with respect to the rivet strap so as to permit the ring lug to be moved into and out of the predetermined jamming position by pulling on the tape fastener.

2. The jamming device according to claim 1, characterized in that the gap between the end face of the jamming cleat and the inner surface of the ring lug is smaller than a thickness of the tape fastener in the undeformed condition.

3. The jamming device according to claim 1, characterized in that the gap is approximately constant over the extent of the end face of the jamming cleat, or over the extent of the inner surface of the ring lug.

4. The jamming device according to claim 1, characterized in that the jamming cleat is joined to the rivet strap as one piece.

5. The jamming device according to claim 1, wherein the rivet strap comprises a fixing tab, and wherein the jamming cleat rises above an upper surface of the fixing tab by a height which is greater than a diameter of the ring lug.

6. The jamming device according to claim 5, characterized in that the end face of the jamming cleat has a groove-like indentation extending generally concentrically with the end face.

7. The jamming device according to claim 6, wherein the fixing tab defines a hinge bearing for the ring lug, the hinge bearing having a bearing hole, and wherein a width of the jamming cleat is slightly smaller than an inner width of the ring lug measured parallel to the bearing hole of the hinge bearing.

8. The jamming device according to claim 7, characterized in that the region of the hinge bearing accommodating the bearing hole tapers towards the upper surface of the fixing tab.

9. The jamming device according to claim 8, characterized in that the gap extends parallel with the upper surface of the fixing tab and is bounded by the inner surface of the ring lug and a facing surface of the groove-like indentation and is smaller than a thickness of the tape fastener in the undeformed condition.

10. The jamming device according to claim 7, characterized in that the region accommodating the bearing hole is formed by ribs extending symmetrically about and parallel with a longitudinal center line of the rivet strap and rising above the upper surface of the fixing tab.

11. The jamming device according to claim 7, characterized in that the ring lug is formed approximately in the shape of a C and includes opposite ends which form hinge arms which are oppositely directed towards each other and project into the bearing hole.

12. The jamming device according to claim 11, wherein the jamming cleat is formed from a component which is folded over upon itself such that one leg of the jamming cleat overlies another leg thereof, and wherein the legs have through holes for the fixing element in register with one another, with an end region of one leg forming a bearing hole for the hinge arms of the ring lug.

13. The jamming device according to claim 12, characterized in that the jamming cleat comprises a latching projection, the latching projection rising above the upper surface of the rivet strap.

14. The jamming device according to claim 13, characterized in that the one leg of the rivet strap includes a crimped region defining the bearing hole (60) regions of the jamming cleat (9; 43), the upper surface (16) and a crimped bearing on the rivet strap (2) clasping the hinge arms (25) between latching projection (60) and upper surface (16) in an approximately quadrantal, the crimped region being adjacent the latching projection.

15. The jamming device according to claim 14, characterized in that a pivot radius of the ring lug measured from a pivot axis of the bearing hole to the inner surface of the ring lug is smaller than a span which is measured from the pivot axis to a rim formed the end face (35) and the contact surface (11) or the on the latching projection adjacent the jamming zone, such that rim tends to prevent the ring lug from being moved out of the predetermined jamming position.

16. The jamming device according to claim 1, characterized in that the ring lug pivots through an angle of less than 180° through elastic deformation of the ring lug, from the predetermined jamming position extending parallel with the upper surface in which the tape fastener is locked, to a position further away from the upper surface (16) in which the tape fastener is released.

17. The jamming device according to claim 1, characterized in that the rivet strap is embedded in the jamming cleat and is formed from sheet metal, ceramics or as a lattice or web of plastic with fiber reinforcement.

18. The jamming device according to claim 1, characterized in that the rivet strap is separate from the jamming cleat and wherein the jamming cleat includes an integral fixing tab which is attached by a fixing element to the rivet strap.

19. The jamming device according to claim 18, characterized in that the rivet strap has at least one through hole for the fixing element, extending coaxially with a corresponding hole in the fixing tab.

20. The jamming device according to claim 18, characterized in that the jamming cleat and the fixing tab are integrally formed as a one-piece member.

\* \* \* \* \*

UNITED STATES PATENT AND TRADEMARK OFFICE
CERTIFICATE OF CORRECTION

PATENT NO. : 5,852,857

DATED : December 29, 1998

INVENTOR(S) : Mark et al.

It is certified that error appears in the above-identified patent and that said Letters Patent is hereby corrected as shown below:

On the title page item 56

In the References Cited, FOREIGN PATENT DOCUMENTS, line 1, "5/1990" should read --11/1990--.

Column 8, line 24, before "lug" insert --ring--.

Column 9, lines 30-34, cancel "(60) regions of the jamming cleat (9; 43), the upper surface (16) and a crimped bearing on the rivet strap (2) clasping the hinge arms (25) between latching projection (60) and upper surface (16) is an approximately quadrantal".

Column 10, lines 5 and 6, cancel "the end face (35) and the contact surface (11) or the".

Column 10, line 7, after "that" insert --the--; line 15, cancel "(16)".

Column 2, line 4, "claim 12" should read --claim 18--; line 12 "claim 13" should read --claim 19--; line 15 "claim 14" should read --claim 20--; line 17 "claim 15" should read --claim 12--; line 22 "claim 16" should read --claim 13--; line 26 "claim 17" should read --claim 14--; line 31 "Claim 18" should read --Claim 15--; line 36 "claim 19" should read --claim 16--; line 41 "claim 20" should read --claim 17--.

Signed and Sealed this

Twenty-fifth Day of May, 1999

*Attest:*

Q. TODD DICKINSON

*Attesting Officer*  Acting Commissioner of Patents and Trademarks